United States Patent [19]

Sunohara et al.

[11] 4,160,392
[45] Jul. 10, 1979

[54] AUTOMATIC POWER TRANSMISSION WITH DIRECT-DRIVE CLUTCH

[75] Inventors: Yoshio Sunohara; Kunio Ohtsuka, both of Yokohama; Wataru Ishimaru, Fujisawa; Takahiro Yamamori, Tokyo; Toshio Shibuya, Yokosuka, all of Japan

[73] Assignee: Nissan Motor Company, Limited, Japan

[21] Appl. No.: 770,031

[22] Filed: Feb. 18, 1977

[30] Foreign Application Priority Data

Feb. 20, 1976 [JP] Japan ................................ 51-17791

[51] Int. Cl.² .......................................... F16H 47/00
[52] U.S. Cl. ....................................... 74/732; 74/733
[58] Field of Search ................. 74/730, 731, 732, 733, 74/687; 192/3.3

[56] References Cited

U.S. PATENT DOCUMENTS

| | | | |
|---|---|---|---|
| 3,805,640 | 4/1974 | Schneider et al. | 74/733 X |
| 3,857,302 | 12/1974 | Morris | 74/733 |
| 3,964,347 | 6/1976 | Ahlen | 74/733 |

Primary Examiner—Lawrence J. Staab
Assistant Examiner—Frank H. McKenzie, Jr.
Attorney, Agent, or Firm—Robert E. Burns; Emmanuel J. Lobato; Bruce L. Adams

[57] ABSTRACT

In an automatic power transmission including hydrodynamic torque transmitting means such as a torque converter or a fluid coupling and fluid-operated direct-drive clutch means combined with the torque converter or fluid coupling, control valve means is provided so that the direct-drive condition is achieved from the top-gear condition at a retarded timing after the top gear has been attained under low-load conditions of the engine although direct-drive condition is established simultaneously when an upshift is made to the top gear under high-load operating conditions of the engine.

8 Claims, 6 Drawing Figures

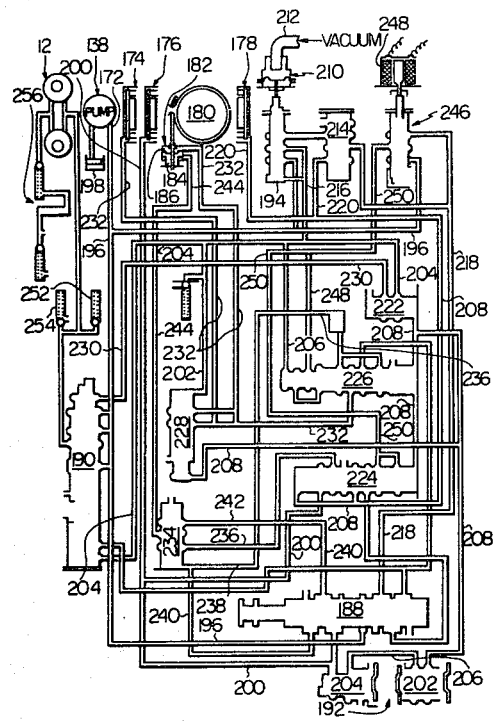

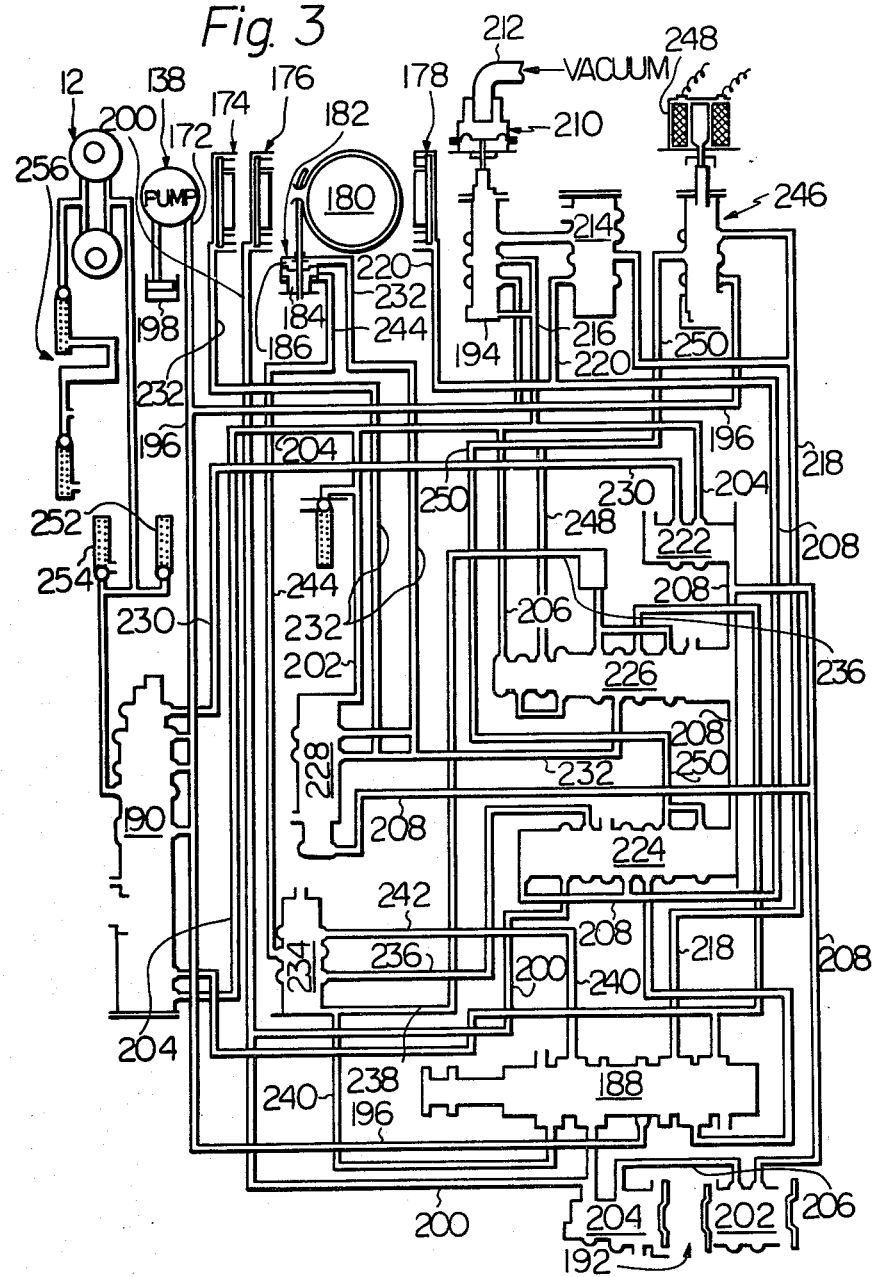

AUTOMATIC POWER TRANSMISSION WITH DIRECT-DRIVE CLUTCH

BACKGROUND OF THE INVENTION

The present invention relates to automatic power transmissions for use in engine-driven automotive vehicles and particularly to an automatic power transmission including hydrodynamic torque transmitting means such as a torque converter or a fluid coupling and a fluid-operated direct-drive clutch unit combined with the torque converter or the fluid coupling for providing direct driving connection between the output shaft of an engine and the input shaft of the transmission when the clutch unit is coupled. More specifically, the present invention is concerned with means for controlling the actions of such a direct-drive clutch unit on the basis of the vehicle speed and the load on the engine.

Some automatic power transmission with hydrodynamic torque transmitting means such as torque converters or fluid couplings are equipped with fluid-operated direct-drive clutch units for the purpose of eliminating the loss in torque transmission efficiencies resulting from the slippage between the driving and driven members of the torque converters or fluid couplings. Such a direct-drive clutch unit is mechanically combined with the torque converter or the fluid coupling incorporated in the transmission and is operated by interaction between the fluid pressure developed in the torque converter or fluid coupling and a control fluid pressure developed in and delivered from the hydraulic control system of the power transmission. For simplicity of construction and by reason of the low production cost, it appears promising to have the control system arranged in such a manner as to bring the direct-drive clutch unit into coupled condition simultaneously when an upshift is made to the top gear in the automatic forward-drive range of the transmission. If, therefore, the top gear is attained at a low vehicle speed under low-load operating conditions of the engine, the vehicle must be accelerated from the low speed directly by the engine without the aid of the torque converter or fluid coupling. An excessive burden is therefore imposed on the engine under these conditions especially when the engine is of a small capacity. This not only invites deterioration of the accelerating performance of the vehicle but causes production of unusual and unpleasant shocks and noises in the vehicle driveline.

SUMMARY OF THE INVENTION

The present invention contemplates elimination of such a drawback inherent in automatic power transmissions of the described character through provision of control means adapted to produce direct-drive condition after the top gear has been achieved under low-load operating conditions of the engine.

In accordance with the present invention, there is provided in an automatic power transmission including a transmission input shaft, hydrodynamic torque transmitting means such as a torque converter or a fluid coupling connected between the transmission input shaft and the output shaft of an engine of an automotive vehicle, fluid-operated direct-drive clutch means combined with the hydrodynamic transmitting means and forming a variable-volume chamber into which a control fluid pressure is to be directed when the clutch unit is to be coupled, a gear mechanism having a plurality of forward-drive gear ratios including a top-gear ratio and a hydraulic control system including first fluid circuit means for developing therein a first control fluid pressure when the top-gear ratio is in use and second fluid circuit means for developing therein a second control fluid pressure variable with vehicle speed when any of the forward-drive gear ratios is in use, direct-drive control valve means responsive to the first and second control fluid pressures and operative to cause the direct-drive clutch unit to be coupled substantially simultaneously when the top-gear ratio is produced in the gear mechanism under high-load operating conditions of the engine and to cause the direct-drive clutch unit to be coupled at a retarded timing after the top-gear ratio has been produced in the gear mechanism under low-load operating conditions of the engine. The above described control valve means preferably comprises a shift valve unit having a first port communicating with the first fluid circuit means and a second port communicating with the aforesaid variable-volume chamber and a valve element having a first position blocking communication between the first and second ports and a second position providing communication between the first and second ports, the valve element being biased toward the first position thereof and being responsive to the second control fluid pressure in the above-mentioned second fluid circuit means for being moved into the second position thereof when the second control fluid pressure is representative of a vehicle speed higher than a predetermined level. The control valve means may further comprise an orifice valve unit provided between the aforesaid variable-volume chamber and the above described shift valve unit and operative to pass the first control fluid pressure from the shift valve to the variable-volume chamber at a restricted rate when the valve element of the shift valve unit is in the second position thereof and to discharge the fluid from the variable-volume chamber therethrough at a substantially unrestricted rate.

BRIEF DESCRIPTION OF THE DRAWINGS

The features and advantages of the present invention will be more specifically understood from the following description taken in conjunction with the accompanying drawings, in which:

FIG. 3 is a schematic diagram showing an example of the hydraulic control system into which the embodiment of the present invention may be incorporated;

DESCRIPTION OF THE PREFERRED EMBODIMENTS

Figure 1:
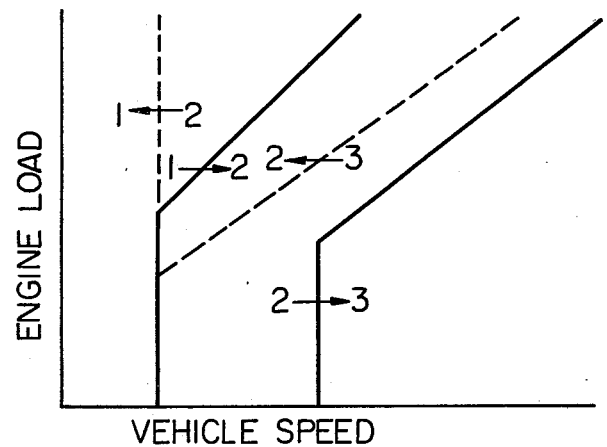
FIG. 1 is a graph showing examples of gear shift schedules established in a prior-art three-forward-speed automatic power transmission of the described nature.

The graph of FIG. 1 illustrates gear shift schedules which are achieved in an automatic power transmission including hydrodynamic torque transmitting means such as a torque converter or a fluid coupling an a direct-drive clutch unit which is arranged to be coupled simultaneously when the top gear is produced in the transmission gear mechanism irrespective of the load which is impressed on the engine. In FIG. 1, the transmission is assumed to be of the three-forward-speed type and, thus, upshifts from the first gear to the second gear and from the second gear to the third gear in direct-drive condition are made as shown by the arrows indicated by 1 to 2 and 2 to 3(DD), respectively and downshifts from the third gear in the direct-drive condition to the second gear and from the second gear to the first gear are made as shown by the arrows indicated by 3(DD) to 2 and 2 to 1, respectively. As previously noted, the present invention has for its object in providing direct-drive control valve means adapted to vary the gear shift schedules of FIG. 1 in such a manner that the direct shifting between the second gear and the direct-drive condition is achieved only when the load on the engine is higher than a certain level. If the engine load is lower than the certain level, the direct-drive condition is established at a retarded timing after an upshift from the second gear to the third gear has been made, thereby enabling the vehicle to be accelerated in stable condition from a low speed.

Figure 2:
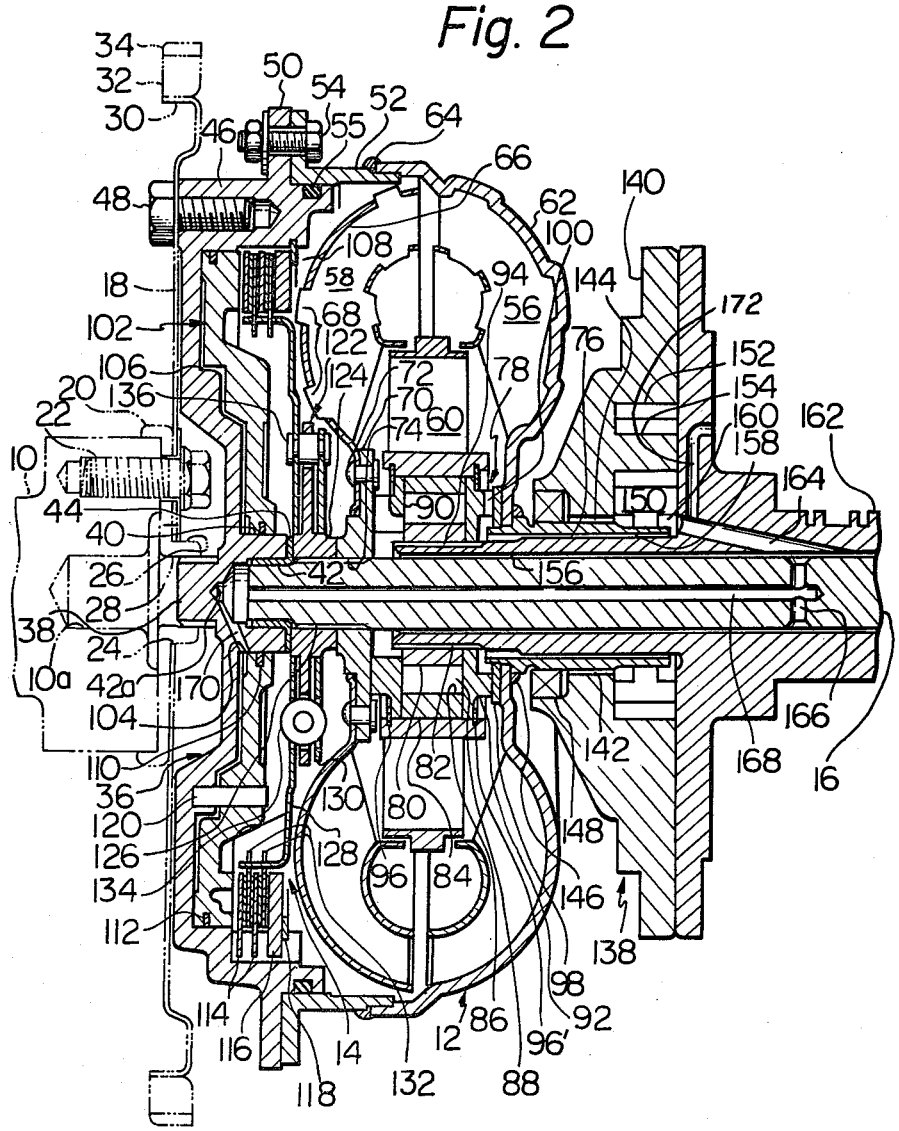
FIG. 2 is a longitudinal sectional view of an example of the torque converter and direct-drive clutch arrangement with which an embodiment of the present invention is to be in use.

FIG. 2 shows a torque converter and direct-drive clutch assembly forming part of an embodiment of the automatic power transmission according to the present invention. Though not shown in the drawings, the torque-converter and direct-drive clutch assembly is positioned intermediate between the crankshaft 10 of an automotive internal combustion engine and the transmission gear mechanism of usually the planetary-gear design and is enclosed together with the gear mechanism and the associated clutches and brakes within a transmission casing, as is well known in the art. The torque-converter and direct-drive clutch assembly comprises a torque converter unit 12 and a direct-drive clutch unit 14 which are coaxially arranged about the center axis of a transmission input shaft 16 which extends substantially in line with the engine crankshaft 10. The transmission input shaft 16 is operatively connected through the above-mentioned transmission gear mechanism and the associated clutches and brakes to a transmission output shaft, which in turn is connected through a propeller shaft, front and rear universal joints and a differential gear unit to wheel axles of the vehicle, though not shown in the drawings but as is also well known in the art. Driving connection is provided from the crankshaft 10 of the engine to the torque converter unit 12 and the direct-drive clutch unit 14 through a generally circular flexible drive plate 18 which is securely attached through a pilot bearing 20 to the rear end face of the crankshaft 10 by suitable fastening means such as bolts one of which is indicated at 22. The drive plate 18 is formed with a central opening 24 having a center axis substantially aligned with the center axes of the crankshaft 10 and the transmission input shaft 16. The pilot bearing 20 has a central hub portion 26 projecting axially away from the rear end of the crankshaft 10 through the central opening 24 in the drive plate 18 and having an axial bore 28 which is open to and substantially in line with the counterbore 10a formed in a rear end portion of the crankshaft 10. The hub portion 26 of the pilot bearing 20 is internally formed with axial serrations defining the axial bore 28. The drive plate 18 further has a flange portion 30 along its entire outer circumference and has fixedly attached to the outer peripheral face of the flange portion 30 a ring-shaped flywheel 32. The flywheel 32 is formed with external teeth 34 for mating engagement with the driving gear of the engine cranking system (not shown) of the vehicle as is customary in the art.

The torque converter unit 12 comprises a torque converter cover 36 having a front boss portion 38 and a rear hub portion 40 which project forwardly and rearwardly, respectively, from a central portion of the converter cover 36 and which have respective center axes substantially aligned with the center axis of the transmission input shaft 16 and accordingly with the center axis of the axial bore 28 in the hub portion 26 of the pilot bearing 20. The front boss portion 38 of the converter cover 36 is received in the axial bore 28 in the hub portion 26 of the pilot bearing 20. On the other hand, the rear hub portion 40 of the converter cover 36 is formed with a counterbore 42 which is open at the rear end of the hub portion and closed in the front boss portion 38 of the converter cover 36 as shown. A flanged bushing 44 is closely received in the counterbore 42 in the hub portion 40 with its flange portion attached to the annular rear end face of the hub portion 40 and has slidably received in the tubular portion of the bushing 44 a front end portion of the transmission input shaft 16 so that the converter cover 36 in its entirety is rotatable relative to the transmission input shaft 16 about the center axis of the shaft 16. In this instance it is important that the counterbore 42 in the rear hub portion 40 of the converter cover 36 be so sized as to constantly form an open space or cavity 42a between the front end face of the transmission input shaft 16 and the bottom of the counterbore 42 irrespective of the axial position of the converter cover 36 relative to the transmission input shaft 16.

The converter cover 36 further has a generally cylindrical outer flange portion 46 which is securely connected to an outer circumferential portion of the drive plate 18 by suitable fastening means such as bolts one of which is shown at 48 so that the converter cover 36 is rotatable with the engine crankshaft 10 through the drive plate 18 about the center axis of the transmission input shaft 16. The drive plate 18 is, thus, adapted to transmit the driving torque of the engine crankshaft 10 to the torque converter cover 36 when the engine is in operation or being driven by the cranking system for the engine through the externally toothed flywheel 32 mounted on the drive plate 18. The converter cover 36 is enabled to slightly move in axial direction toward and away from the rear end of the engine crankshaft 10 by elastic deformation of the flexible drive plate 18 which is constructed of elastic metal. The converter cover 36 further has an outer rim portion 50 projecting radially outwardly from the flange portion 46. A generally ring-shaped, flanged torus cover 52 has its flange portion fixedly attached to the rim portion 50 of the converter cover 36 by suitable fastening means such as bolts one of which is indicated at 54. The torus cover 52 has a cylindrical portion extending rearwardly from the rim portion 50 of the converter cover 36 as illustrated. Between the flange portion 46 of the converter cover 36 and the torus cover 52 is interposed a converter cover O-ring seal 55 which is received in a circumferential groove formed in the flange portion 46.

The torque converter unit 12 is shown, by way of example, to be of the three-member design consisting of an impeller 56, a turbine 58 and a stator 60. The impeller 56 comprises a driving torus member 62 which is welded or otherwise securely connected to the above-mentioned torus cover 52 along its outer circumferential edge as indicated at 64, the torus member 62 being thus rotatable with the converter cover 36 about the center axis of the transmission input shaft 16. The turbine 58 is positioned in front of the impeller 56 and comprises a driven torus member 66 formed with openings 68 and securely mounted along its inner peripheral end portion on a generally annular turbine support disc 70 by suitable fastening means such as studs or rivets 72, the turbine support disc 70 having a central hub portion which is internally formed with axial serrations. The transmission input shaft 16 has axial serrations formed on its axial portion adjacent to the front end portion thereof received in the rear hub portion 40 of the converter cover 36 and has the hub portion of the turbine support disc 70 splined thereto as at 74. The turbine support disc 70 and the torus member 66 constituting the turbine 58 are, thus, rotatable as a single unit with the transmission input shaft 16 about the center axis of the shaft 16. On the other hand, the stator 60 is positioned between the impeller 56 and the turbine 58 and is supported by a stationary stator support hollow shaft 76 through a torque converter one-way clutch assembly 78. The stator support hollow shaft 76 has passed therethrough the transmission input shaft 16 in substantially coaxial relationship to the shaft with the axially serrated portion of the shaft 16 projecting forwardly from the front end of the hollow shaft 76. The stator support hollow shaft 76 is formed with external axial serrations on its front end portion coextensive with the stator 60. Though not shown, each of the impeller 56, turbine 58 and stator 60 has a number of vanes which are arranged in symmetry about the center axis of the transmission input shaft 16 as is well known in the art.

The torque converter one-way clutch assembly 78 comprises a hub 80 internally formed with axial serrations which are in mating engagement with the external axial serrations of the stator support hollow shaft 76 as at 82, and a generally ring-shaped cam 84 coaxially and slidably received on the outer peripheral surface of the hub 80. The cam 84 is formed with a plurality of axial grooves 86 which are arranged in symmetry about the center axis of the hub 80 and which are open to the outer peripheral surface of the hub 80. A spring loaded roller 88 is mounted within each of these grooves 86 and is in rollable contact with the outer peripheral surface of the hub 80 for permitting the cam 84 to rotate on the hub 80 in one direction about the center axis of the transmission input shaft 16. The cam 84 has its front and rear end faces in contact with a front thrust ring 90 and a rear thrust pad 92, respectively, the thrust pad 92 being splined to the axially serrated portion of the stator support hollow shaft 76. The thrust ring 90 and the thrust pad 92 are securely fastened to the stator 60 by means of front and rear retaining washers 96 and 96', respectively. The stator 60 is thus rotatable with the cam 84 of the clutch assembly 78 in one direction about the center axis of the transmission input shaft and is locked up to the hub 80 on the stator support hollow shaft 76 when urged to turn in the opposite direction. The thrust pad 92 is in slidable contact at its rear end with a washer 98 on the inner or front surface of a radially inner peripheral end portion of the torus member 62 of the impeller 56 and is formed with a groove 100 which is open at one end into the impeller 56 as shown for the reason that will be understood as the description proceeds.

On the other hand, the direct-drive clutch unit 14 comprises a generally disc-shaped clutch piston 102 positioned between the converter cover 36 and the turbine 58 of the torque converter unit 12 and having a central opening 104. The clutch piston 102 is axially slidably mounted on the rear hub portion 40 of the converter cover 36 through the central opening 104 and has an outer peripheral surface slidably received along its entire circumferential extent on the inner peripheral surface of the outer flange portion 46 of the converter cover 36. The clutch piston 102 is thus axially movable toward and away from the rear face of the converter cover 36 and forms a variable-volume chamber 106 between the rear face of the converter cover 36 and the front face of the clutch piston 102 and a variable-volume space 108 between the rear face of the clutch piston 102 and the torus member 66 of the turbine 58 of the torque converter unit 12. The variable-volume chamber 106 is hermetically isolated from the variable-volume space 108 by means of an O-ring seal 110 received in a circumferential groove in the inner peripheral edge of the clutch piston 102 slidable on the rear hub portion 40 of the converter cover 36 and an O-ring seal 112 which is received in a circumferential groove formed in the outer peripheral edge of the clutch piston 102 slidable on the inner peripheral surface of the cylindrical outer flange portion 46 of the converter cover 36. A suitable number of annular driving plates 114 which are herein shown as two in number by way of example are securely mounted on the inner peripheral surface of the outer flange portion 46 of the converter cover 36 in coaxial relationship to the clutch piston 102 and are slightly spaced apart from each other in a direction parallel with the center axis of the transmission input shaft 16. The driving plates 114 project radially inwardly from the inner peripheral surface of the outer flange portion 46 of the converter cover 36 and are located to be engageable with the rear face of the outer rim portion of the clutch piston 102 when the clutch piston 102 is moved away from the rear face of the converter cover 36, viz., in a direction to move the variable-volume chamber 106 between the converter cover 36 and the clutch piston 102. The driving plates 114 are rotatable with the converter cover 36 and accordingly with the crankshaft 10 of the engine about the center axis of the transmission input shaft 16. The converter cover 36 has further securely mounted on the outer flange portion 46 thereof an annular stop plate 116 which is rearwardly spaced apart from and axially aligned with the driving plates 114 and which is retained to the flange portion 46 of the converter cover 36 by means of a snap ring 118 as shown.

Designated by reference numeral 120 is one of guide pins which are secured to the clutch piston 102 in parallel with the center axis of the piston 102 and which are slidably received in holes formed in the converter cover 36 for supporting the axial movement of the clutch piston 102 relative to the converter cover 36.

The direct-drive unit 14 further comprises a clutch disc assembly 122 for providing and interrupting driving connection from the converter cover 36 to the transmission input shaft 16 through the above described driving plates 114 by the aid of the clutch piston 102. The clutch disc assembly 122 comprises a disc hub 124 internally axially serrated as at 126 and splined to the externally serrated axial portion of the transmission input shaft 16, the hub 124 intervening between the rear hub portion 40 of the converter cover 36 and the central hub portion of the turbine support disc 70 and axially movable therebetween. The disc hub 124 has an annular flange portion interposed between front and rear disc webs 128 and 130 which are slightly spaced apart from both sides of the flange portion of the disc hub 124. The front disc web 128 is larger in diameter than the rear disc web 130 and has a wavy outer flange portion axially extending radially internally of the above described driving plates 114 on the converter cover 36. A suitable number of annular driven plates 132 are securely mounted on the outer flange portion of the front disc web 128 in coaxial relationship to the transmission input shaft 16, the driven plates 132 being herein shown as two in number in consonance with the two driving plates 114 and each of the driven plates 132 having a pair of clutch facings bonded or otherwise securely attached to both faces of the driven plate. One of the driven plates 132 is interposed between the driving plates 114 and the other is interposed between the rear one of the driving plates 114 and the stop plate 116 on the converter cover 36. The clutch disc assembly 122 further comprises dampening means for absorbing torsional vibrations resulting from engine firing pulses. Such dampening means is shown comprising coiled torsion damper springs 134 which are respectively received in a series of openings circumferentially formed in the flange portion of the disc hub 124 and which are held in place between the front and rear disc webs 128 and 130 through openings which are formed in the webs. The front and rear disc webs 128 and 130 are connected together by stop pins 136 which are loosely passed through holes formed in the flange portion of the disc hub 124 for limiting the relative rotation between the hub flange and the webs, each of the stop pins being located between every two of the torsion damper springs 134.

Behind the torque converter unit 12 is mounted a transmission oil pump unit 138 which comprises a pump body 140 splined as at 142 to an externally axially serrated pump support sleeve 144 passing the previously described stator support hollow shaft 76 therethrough. The pump support sleeve 144 is secured or welded as at 146 to the inner peripheral edge of the torus member 62 constituting the impeller 56 of the torque converter unit 12 so that the pump body 140 is rotatable with the impeller 56 and accordingly with the crankshaft 10 of the engine about the center axis of the transmission input shaft 16. Between the pump body 140 and the pump support sleeve 144 is interposed a pump seal ring 148. An externally toothed inner spur gear 150 is rotatable with the pump body 140 about the center axis of the transmission input shaft 16. The inner spur gear 150 is partially in mesh with an internally toothed outer spur gear 152 having a center axis eccentric to the center axis of the inner spur gear 150. The inner and outer spur gears 150 and 152 are thus partially separated from each other and from therebetween a generally crescent space within which a crescent filler block 154 forming part of the pump body 140 is interposed as is customary. The inner spur gear 150 is preferably keyed to the pump support sleeve 144.

The stator support hollow shaft 76 is radially spaced apart outwardly and inwardly from the outer and inner peripheral surfaces of the transmission input shaft 16 and the pump support sleeve 144, respectively, and form an inner cylindrical passageway 156 between the outer peripheral surface of an intermediate axial portion of the transmission input shaft 16 and the inner peripheral surface of the stator support hollow shaft 76 and an outer cylindrical passageway 158 between the outer peripheral surface of the stator support hollow shaft 76 and the inner peripheral surface of the pump support sleeve 144. The inner cylindrical passageway 156 is in communication with the turbine 58 of the torque converter unit 12 through a generally annular space between the turbine support disc 70 and the torque converter one-way clutch assembly 78 as shown, while the outer cylindrical passageway 158 is in communication with the impeller 56 of the torque converter unit 12 through the groove 100 in the thrust pad 92 forming part of the torque converter stator 60. The oil pump unit 138 has an oil delivery port 160 which is open to the outer cylindrical passageway 158. The stator support hollow shaft 76 is integral with a stationary wall structure enclosing an intermediate axial portion of the transmission input and having a flat front end face with which the pump body 140 is in circumferentially slidable contact. The stationary wall structure 162 is formed with a passageway 164 which is open at one end to the oil delivery port 160 of the oil pump unit 138 and at the other end to the above described inner cylindrical passageway 156 between the transmission input shaft 16 and the stator support hollow shaft 76, the passageway 156 being partly formed between the transmission input shaft 16 and the inner peripheral surface of the stationary wall structure 162. The oil delivery port 160 of the oil pump unit 138 is, thus, in constant communication with the torque converter impeller 56 through the outer cylindrical passageway 158 between the stator support hollow shaft 76 and the pump support sleeve 144 and the groove 100 in the thrust pad 92 of the stator 60 and with the torque converter turbine 58 through the above-mentioned passageway 164 in the stationary wall structure 162 and the inner cylindrical passageway 156 between the transmission input shaft 16 and the stator support hollow shaft 76. The stationary wall structure 162 is adapted to support thereon various actuating units such as clutches and brakes incorporated in the power transmission.

The transmission input shaft 16 is formed with a diametrical through hole 166 which is constantly open to the passageway 164 in the stationary wall structure 162 and an axial groove or bore 168 extending from the through hole 166 and open at the foremost end of the shaft 16. Constant communication is thus established between the oil delivery port 160 of the pump unit 138 and the open space 42a forming part of the counterbore 42 in the rear hub portion 40 of the converter cover 36 through the passageway 164 in the stationary wall structure 162 and the diametrical through hole 166 and axial bore 168 in the transmission input shaft 16. The converter cover 36 has formed in the rear hub portion 40 thereof a groove 170 providing constant communication between the open space 42a in the hub portion 40 and the previously described variable-volume chamber 106 between the converter cover 36 and the clutch piston 102. Though not shown, the oil pump unit 138 has an oil inlet port communicating with an oil pan or sump through an oil screen or filter disposed in the bottom of the pan or sump.

The passageway 164 in the stationary wall structure 162 is in communication through a passageway 172 also formed in the wall structure 162 with a hydraulic control system so that the oil pressure in the passageway 164 is regulated from zero to a level higher than the oil pressure in the torque converter unit 12 depending upon the load on the engine and the vehicle speed. The oil pressure in the passageway 164 is conducted through the diametrical through hole 166 and axial bore 168 in the transmission input shaft 16 to the open space 42a at the front end of the shaft 16 and further through the open space 42a and groove 170 in the converter cover 36 to the variable-volume chamber 106 between the rear face of the converter cover 36 and the front face of the clutch piston 102. When, thus, the oil pressure developed in the passageway 164 in the stationary wall structure 162 and accordingly in the variable-volume chamber 106 is higher than the torque converter oil pressure acting on the rear face of the clutch piston 102, the force resulting the oil pressure acting on the front face of the clutch piston 102 from the variable-volume chamber 106 is overcome by the force resulting from the torque converter oil pressure acting on the rear face of the clutch piston 102 from the variable-volume space 108 so that the clutch piston 102 is moved forward and held in contact with the rear face of the converter cover 36, providing a minimum volume in the variable-volume chamber 106. Under these conditions, the clutch piston 102 is disengaged from the driving plates 114 on the converter cover 36. Clearances are therefore produced between the driving plates 114 on the converter cover 36 and the driven plates 132 of the clutch disc assembly 122. This allows the converter cover 36 and the driving plates 114 to rotate with the crankshaft 10 of the engine independently of the driven plates 132 and accordingly of the clutch disc assembly 122. The direct-drive clutch unit 14 is thus held inoperative so that the driving torque of the engine crankshaft 10 is transmitted to the transmission input shaft 16 through the converter cover 36, torus cover 52, driving torus member 62 of the converter impeller 56, driven torus cover 66 of the converter turbine 58 and turbine support disc 70.

When, conversely, the oil pressure developed in the variable-volume chamber 106 between the converter cover 36 and the clutch piston 102 is higher than the torque converter pressure, then the force resulting from the oil pressure acting on the front face if the clutch piston 102 overcomes the force resulting from the torque converter oil pressure acting on the rear face of the clutch piston 102 and moves the clutch piston 102 rearwardly away from the rear face of the converter cover 36, viz., in a direction to expand the variable-volume chamber 106. The clutch piston 102 is now brought into pressing engagement with the driving plates 114 on the converter cover 36 with the result that the driven plates 132 of the clutch disc assembly 122 are pressed upon between the driving plates 114 and stop plate 116 and are accordingly rotated with the converter cover 36. The direct-drive clutch unit 14 being thus coupled, the driving torque imparted to the driving plates 114 on the converter cover 36 from the engine crankshaft 10 is transmitted through the clutch disc assembly 122 to the transmission input shaft 16. Under these conditions, the engine crankshaft 10, torque converter unit 12, direct-drive clutch unit 14 and transmission input shaft 16 are rotated as a single unit so that the transmission input shaft 16 has a revolution speed equal to the revolution speed of the crankshaft 10.

The driveline posterior to the transmission input shaft 16 is constructed and arranged similarly to that of a usual automatic power transmission and is not herein illustrated.

FIG. 3 shows an example of the circuit arrangement of the hydraulic control system into which control means for regulating the oil pressure for operating the above described direct-drive clutch unit 14 is to be incorporated. The hydraulic control system herein shown is, in itself, adapted for use in a three-forward-speed and one-reverse-speed automatic power transmission void of a direct-drive clutch arrangement and is arranged to selectively actuate friction elements and servos including a front or high-and-reverse clutch 174, a rear or forward-drive clutch 176, a low-and-reverse brake 178 and a brake band 180. These clutches and brakes are associated with the planetary gear train forming part of the power transmission and are selectively actuated to produce any of the first or low, second or intermediate and third or top gears and the reverse gear as the case may be. More specifically, the rear or forward-drive clutch 176 is adapted to be coupled when any of the first and second gears in the manual or automatic forward drive range or the third gear in the automatic forward-drive range is to be produced. The front or high-and-reverse gear 174 is adapted to produce the third gear in the automatic forward-drive range in cooperation with the forward drive clutch 176 or the reverse gear in cooperation with the low-and-reverse brake 178 when coupled. The low-and-reverse brake 178 is operative to produce the first gear in the manual forward-drive range in cooperation with the forward-drive clutch 176 or the reverse gear in cooperation with the high-and-reverse clutch 174 when applied. On the other hand, the brake band 180 is connected to a hydraulic band servo unit 182 which includes a spring-loaded piston movable between apply-side and release-side chambers 184 and 186. In the absence of oil pressure in both of the apply-side and release-side chambers 184 and 186 of the servo unit 182, the brake band 180 is held released and produces the first gear in the automatic forward-drive range with the forward-drive clutch 176 in couple condition. When an oil pressure is developed in the apply-side chamber 186 in the absence of an oil pressure in the release-side chamber 186 of the servo unit 182, then the brake band 180 is applied so that the second gear is produced in the manual forward-drive range with the forward-drive clutch 176 in coupled condition. When oil pressures are concurrently present in both of the apply-side and release-side chambers 184 and 186 of the servo unit 182, then the brake band 180 is released and at the same time the high-and-reverse clutch 174 is coupled to produce the third gear in the automatic forward-drive range. When the reverse gear is in play with the high-and-reverse clutch 174 coupled and the low-and-reverse brake 180 applied, the forward-drive clutch 176 is held uncoupled and the brake band 180 is held released in the absence of oil pressures in both of the apply-side and release-side chambers 184 and 186 of the band servo 182.

The hydraulic control system for operating these clutches 174 and 176, brake 178 and band 180 comprises a manually-operated selector valve 188, a first control pressure or line-pressure regulator valve 190, a second control pressure regulator valve or governor valve 192 and a third control pressure regulator valve or transmission throttle valve 194. The manually operated selector valve 188 has a parking position (P), a reverse position (R), a neutral position (N), an automatic forward-drive range position (DR), and manual first, second and third gear positions ($D_1$, $D_2$ and $D_3$) and is moved into any of these positions from a selector lever (not shown) to be manipulated by a vehicle driver. The oil pressure to be passed through the selector lever 188 is initially delivered from the oil pump unit 138 and is regulated into a substantially constant first control pressure or line pressure $P_1$ by means of the line-pressure regulator valve 190 with which the oil pump 138 is in constant communication through a line-pressure circuit 196 leading from the passageway 172 formed in the stationary wall structure 162 illustrated in FIG. 2. In FIG. 3, the oil pump 138 is shown to have its suction side communicating with an oil sump 198 provided with an oil strainer.

When the selector valve 188 is in any of the manual or automatic forward drive positions $D_1$, $D_2$ and DR, the line pressure fed to the selector valve through the line-pressure circuit 196 is passed through the valve 188 to an oil circuit 200 which is in communication with the previously mentioned governor valve 192. The governor valve 192, mounted on the output shaft (not shown) of the transmission mechanism, is rotatable with the transmission output shaft and consists of the primary governor valve unit 202 and a secondary governor-valve unit 204, communication being provided between the valve units 202 and 204 through a passageway 206. The secondary governor valve unit 204 has an inlet port communicating with the above-mentioned oil circuit 200 leading from the selector valve 188 and is operative to produce from the line pressure an output oil pressure which is variable with the transmission output shaft speed. The output oil pressure of the secondary governor valve unit 204 is passed to the primary governor valve unit 202 through the above-mentioned passageway 206. The primary governor valve unit 202 is arranged to be open in response to a transmission output shaft speed higher than a predetermined level. The governor valve 192 as a whole is, thus, adapted to deliver a second control pressure or governor pressure $P_2$ which is variable with the vehicle speed. The governor pressure thus developed by the governor valve 192 is delivered to a governor-pressure circuit 208.

The line pressure developed by the line-pressure regulator valve 190 is also passed to the previously mentioned transmission throttle valve 194 through the line-pressure circuit 196. The transmission throttle valve 192 is provided with a vacuum-operated valve actuator unit 210 having a vacuum chamber communicating with the intake manifold (not shown) of the engine through a vacuum passageway 212. The throttle valve 192 cooperates with a throttle backup valve 214 and produces in a throttle-valve pressure circuit 216 a third control pressure or throttle-valve pressure $P_3$ which is variable with the vacuum in the intake manifold of the engine, viz., the load on the engine. The throttle backup valve 214 has an inlet port communicating with the selector valve 188 through an oil circuit 218 and is operative to pass the line pressure to an oil circuit 220 when the selector valve 188 is in the manual first gear position $D_1$ or the reverse position R.

The governor pressure circuit 208 leading from the primary governor valve unit 202 of the governor valve 192 is in communication with a throttle-pressure modifier valve 222, a first-second gear shift valve 224, a second-third gear shift valve 226 and a second-to-third gear upshift timing control valve 228. The throttle pressure modifier valve 222 has one inlet port communicating with the throttle-valve pressure circuit 216 and the other inlet port communicating with the governor pressure circuit 208 and is operative to modify the throttle-valve pressure on the basis of the governor pressure, viz., in accordance with the vehicle speed. The modified throttle-valve pressure thus developed by the modifier valve 222 is delivered to a passageway 230 and acts on the line-pressure regulator valve 190. The second-to-third gear upshift timing control valve 228 has one inlet port communicating with the throttle-valve pressure circuit 216 and another inlet port communicating with the governor pressure circuit 208. The timing valve 228 is supplied with the line pressure through an oil circuit 232 leading from the second-third gear shift valve 226 to the front or high-and-reverse clutch 174 and to the release-side chamber 186 of the servo unit 182 of the brake band 180. The gear or forward-drive clutch 176 is in communication with the previously mentioned oil circuit 200 to which the line pressure is passed when the selector valve 188 is in any of the manual or automatic forward drive range. The line pressure passed through the throttle backup valve 214 from the oil circuit 218 is directed on one hand to the low-and-reverse brake 178 and on the other hand to the first-second gear shift valve 224 by way of the oil circuit 220. The throttle-valve pressure delivered from the transmission throttle valve 194 acts on the line-pressure regulator valve 190, throttle-pressure modifier valve 222, first-second gear shift valve 224, second-third gear shift valve 226 and second-to-third gear upshift timing control valve 228 by way of the oil circuit 216.

The first-second and second-third gear shift valves 224 and 226 are in communication with a second-gear lock-out valve 234 through passageways 236 and 238, respectively. The lock-out valve 234 is further in communication with the selector valve 188 through passageways 240 and 242 which are provided in parallel between the lock-out valve 234 and the selector valve 188, the passageway 240 being branched to the above-mentioned passageway 238 leading to the second-third gear shift valve 226. The lock-out valve 234 has an outlet port leading to the apply-side chamber 184 of the servo unit 182 of the brake band 180 through a passageway 244 for developing the line pressure in the chamber 184 of the band servo unit 182 when the selector valve 188 is in the manual second gear position $D_2$ or when the first-second and second-third gear shift valves 224 and 226 are in the positions establishing the second gear with the selector valve 188 in the automatic forward-drive range position DR. When, however, the selector valve 188 is in the first gear position $D_1$ or the reverse position R or the first-second gear shift valve 224 is in the position establishing the first gear with the selector valve 188 in the automatic forward-drive range DR, the second-gear lock-out valve 234 is in a position draining the line pressure from the passageway 244 leading to the apply-side chamber 184 of the band servo unit 182 which is accordingly held inoperative to produce the second gear condition.

The line-pressure circuit 196 is further in communication with a downshift valve 246 which is provided with a solenoid-operated valve actuator unit 248. The solenoid-operated valve actuator unit 248 has a solenoid coil connected across a suitable switch (not shown) provided in association with the accelerator pedal (not shown) of the vehicle so that the above-mentioned switch is closed and accordingly the valve actuator 248 is initiated into action when the accelerator pedal is depressed all the way down. The downshift valve 246 has an inlet port communicating with the previously described oil circuit 218 interconnecting the selector valve 188 and the throttle backup valve 214 and an outlet port communicating with the first-second and second-third gear shift valves 224 and 226 through an oil circuit 250. When the solenoid-operated valve actuator unit 248 is initiated into action as above described with the line pressure developed in the oil circuit 218, the first-second and second-third gear shift valves 224 and 226 are acted upon by the line pressure passed through the downshift valve 246 and are urged toward the respective downshift positions thereof.

Each of the valves above described has a valve spool and a preloaded spring or springs (except for the selector valve which is void of a spring) as is customary in the art but such valve spools and springs have not been shown in the drawing for simplicity of illustration. In FIG. 3, the torque converter 12 is shown to be in communication with the line-pressure regulator valve 190 through a converter-pressure relief valve 252 and a drain-back valve 254 and further with a torque converter oil cooler (not shown) through a one-way check valve arrangement 256, as is customary.

When, in operation, the manually operated selector valve 188 is in any of the manual first and second gear positions $D_1$ and $D_2$ or in the automatic forward-drive range position DR, the line pressure in the line-pressure circuit 196 is passed through the selector valve 188 to the oil circuit 200 so that the rear or forward-drive clutch 176 is coupled. If, under these conditions, the line pressure is directed to the oil circuit 220 leading to the low-and-reverse brake 178 with the selector valve 188 held in the automatic forward-drive range position DR, then the first gear is obtained in the transmission mechanism with the forward-drive clutch 176 coupled and the low-and-reverse brake 178 applied in the absence of the line pressure in both of the oil circuits 244 and 232 leading to the apply-side and release-side chambers 184 and 186, respectively, of the band servo unit 182. If, however, the line pressure is directed to the oil circuit 244 leading to the apply-side chamber 184 of the servo unit 182 by way of the second-gear lock-out valve 234 in the absence of the line pressure in the oil circuit 232 leading to the release-side chamber 186 of the band servo unit 182, the brake band 180 is applied so that the second gear is established in the transmission mechanism with the forward-drive clutch 176 kept coupled. In the presence of the line pressure in both of the oil circuit 244 and 232 leading to the apply-side and release-side chambers 184 and 186, respectively, of the band servo unit 182, the line pressure developed in the oil circuit 232 acts on the front or high-and-reverse clutch 174 so that the third gear is achieved in the transmission mechanism with both of the front and rear or high-and-reverse and forward-drive clutches 174 and 176 in coupled conditions thereof. When the selector valve 188 is in the manual first or second gear position $D_1$ or $D_2$, the first or second gear is produced in the transmission mechanism similarly to the above described conditions in which the first or second gear in the automatic forward-drive range is obtained. When, furthermore, the selector valve 188 is in the reverse position R, the front or high-and-reverse clutch 174 is coupled by the line pressure developed in the oil circuit 232 and concurrently the low-and-reverse brake 178 is applied by the line pressure developed in the oil circuit 220 with the rear or forward-drive clutch 176 uncoupled and the brake band 180 released in the absence of the line pressure in both of the oil circuits 244 and 232 leading to the apply-side and release-side chambers 184 and 186, respectively, of the band servo unit 184. Under these conditions, the reverse gear is achieved in the transmission mechanism.

In accordance with the present invention, the hydraulic control system of the general nature hereinbefore described with reference to FIG. 3 is provided with direct-drive control valve means adapted to establish the direct-drive condition at a timing adequately retarded from the instant at which the third or top gear is achieved in the transmission mechanism during low-load operating conditions of the engine.

Figure 4:
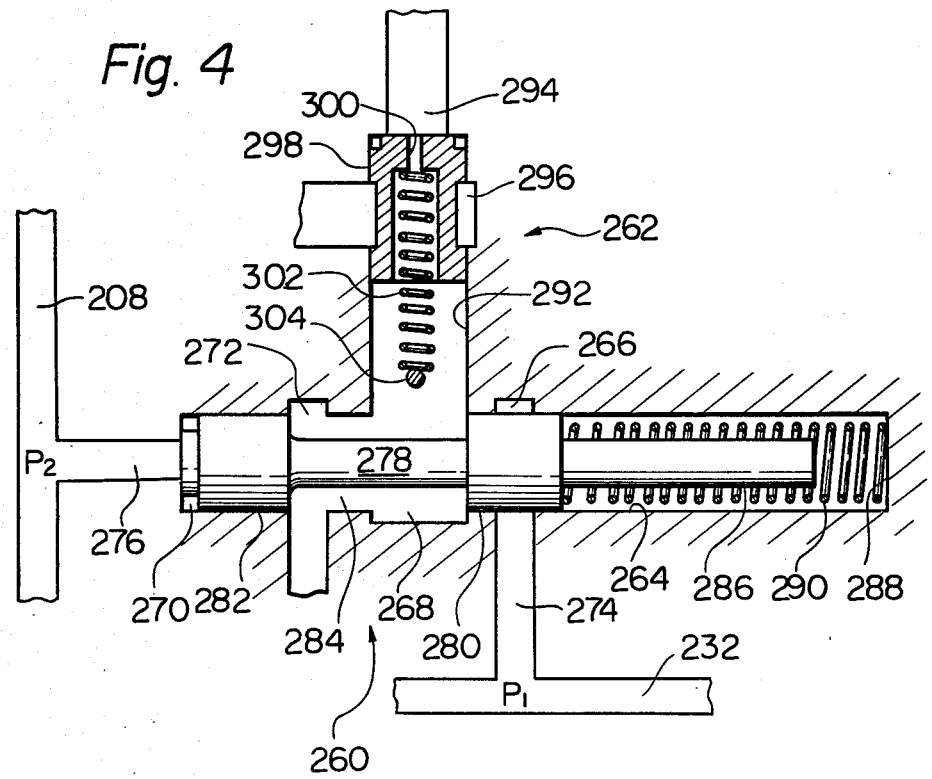
FIG. 4 is a sectional view showing the embodiment of the present invention to an enlarged scale.

Referring to FIG. 4, such direct-drive control valve means is shown comprising a series combination of a third gear-direct drive shift valve unit 260 and a one-way orifice valve unit 262. The third gear-direct drive shift valve unit 260 comprises an elongated valve chamber 264 having first, second, third and fourth ports 266, 268, 270 and 272. The first port 266 is a line-pressure inlet port which is located in a longitudinally intermediate portion of the valve chamber 264 and which communicates through a passageway 274 with the oil circuit 232 leading to the front or high-and-reverse clutch 174 and to the release-side chamber 186 of the servo unit 182 of the brake band 180. In the first or line-pressure inlet port 260 is thus developed the line pressure $P_1$ when the third gear is selected in the transmission mechanism with the manually operated selector valve 188 held in the automatic forward-drive range position DR or when the reverse gear is selected in the transmission mechanism with the selector valve 188 held in the reverse position R. The second port 268 is a line-pressure delivery port which is located between the above described line-pressure inlet port 266 and one longitudinal end of the valve chamber 264 and which is in communication with the one-way orifice valve unit 262 the construction of which will be described later. The third port 270 is a control port which is located at the above-mentioned longitudinal end of the valve chamber 264 and which is in communication through a passageway 276 with the governor-pressure circuit 208 leading from the primary valve unit 202 of the governor valve 192. In the third or control port 270 is thus developed the governor pressure $P_2$ when any of the first, second and third gears is in play in the transmission mechanism with the manually-operated selector valve 188 in any of the manual first and second gear positions $D_1$ and $D_2$ or in the automatic forward-drive range position DR. In other words, there is developed no oil pressure in the control port 270 when the reverse gear is selected in the transmission mechanism with the selector valve 188 moved to the reverse position R thereof. The fourth port 272 is a drain port which is located between the above described line-pressure delivery port 268 and control port 270 and which is in communication with the previously mentioned oil sump 198 shown in FIG. 3.

The third gear-direct drive shift valve unit 260 further comprises a valve spool 278 which is axially movable in the above described valve chamber 264. The valve spool 278 has first and second lands 280 and 282 which are axially spaced apart from each other and which thus form a circumferential groove 284 therebetween, the first land 280 being located in conjunction with the first or line-pressure inlet port 266 and the second land 282 being located adjacent to the third or control port 270 at the above-mentioned longitudinal end of the valve chamber 264. The valve spool 278 has a stem 286 projecting from the outer end face of the first land 280 toward a wall surface 288 closing the valve chamber at the end of the chamber opposite to the control port 270. The valve spool 278 thus configured is axially movable between a first axial position closest to the control port 270 as shown and a second axial position remotest from the control port 270 and having the stem 286 received at its leading end on the above-mentioned wall surface 288 of the valve chamber 264. When the valve spool 278 is in the first axial position as illustrated, the first or line-pressure inlet port 266 is covered and closed by the first land 280 and communication is provided between the second or line-pressure delivery port 268 and the fourth or drain port 272 through the circumferential groove 284 between the first and second lands 280 and 282. Under this condition, the second land 282 of the valve spool 278 is located between the third and fourth or control and drain ports 270 and 272. When, on the other hand, the valve spool 278 is in the second axial position thereof, the first land 280 is located closer to the wall surface 288 of the valve chamber 288 and uncovers the first or line-pressure inlet port 266, providing communication between the first and second or line-pressure inlet and delivery ports 266 and 268 through the circumferential groove 284. Under this condition, the second land 282 of the valve spool 278 is located remoter from the third or control port 270 and covers the fourth or drain port 272, interrupting the communication between the line-pressure delivery port 268 and drain port 272. The circumferential groove 284 between the lands 280 and 282 of the valve spool 278 is thus at all times open to the second or line-pressure delivery port 268 and makes the line-pressure delivery port 268 open to the drain port 272 and line-pressure inlet port 266 therethrough when the valve spool 278 is in the first and second axial positions, respectively, thereof. The valve spool 278 is urged toward the first axial position thereof by suitable biasing means such as a preloade helical compression spring 290 which is seated at one end on the outer end face of the first land 280 of the valve spool 278 and at the other end of the wall surface 288 of the valve chamber 264. The force of the spring 290 thus urging the valve spool 278 toward the third or control port 270 is opposed by a force which results from the governor pressure $P_2$ acting on the outer end face of the second land 282 of the valve spool 278 from the passageway 276 leading from the governor-pressure circuit 208. It is, in this instance important that the spring 290 be selected so that the biasing force thereof is substantially equal to a force resulting from the governor pressure acting on the second land 282 of the valve spool 278 when the governor pressure $P_2$ is representative of a predetermined vehicle speed Vo of a relatively high level. The distance of stroke of the valve spool 278 between the above described first and second axial positions thereof is adjusted by varying the length of the stem 286 which serves as a stop member to abut against the wall surface of the valve chamber 264. Furthermore, the first and second lands 280 and 282 of the valve spool 278 are herein assumed and shown to have substantially equal cross sectional areas so that the forces resulting from the line pressure acting on the opposite inner end faces of the lands 280 and 282 when the valve spool 278 is in the second axial position thereof are cancelled by each other. If it is desired, however, the first and second lands 280 and 282 of the valve spool 278 may be sized to have different cross sectional areas so that the valve spool 278 is axially urged in either direction by the force resulting from the line pressure acting on the differential area between the lands 280 and 282 when the valve spool 278 is in the second axial position thereof, as will be described in more detail as the description proceeds.

On the other hand, the one-way orifice valve unit 262 comprises an elongated valve chamber 292 which is in constant communication with the second or line-pressure delivery port 268 of the third gear-direct drive shift valve unit 160, the valve chamber 292 being shown extending substantially perpendicularly from the valve chamber 264 of the third gear-direct drive shift valve unit 260. The valve chamber 292 of the one-way orifice valve unit 262 has first and second ports 294 and 296. The first port 294 is a line-pressure outlet port which is located opposite to the second or line-pressure delivery port 268 of the third gear-direct drive shift valve unit 260 across the valve chamber 292 of the one-way orifice valve unit 262. The first or line-pressure outlet port 294 is in communication with the previously mentioned passageway 172 formed in the stationary wall structure 162 and communicating with the variable-volume chamber 106 between the converter cover 36 of the torque converter unit 12 and the clutch piston 102 of the direct-drive clutch unit 14 in the arrangement of FIG. 2. On the other hand, the second port 296 of the one-way orifice valve unit 262 is a drain port which is located in the neighborhood of the above described first or line-pressure outlet port 294 and which is in communication with the oil sump 198 shown in FIG. 3.

The one-way orifice valve unit 262 further comprises a generally cylindrical valve spool 298 axially movable in the valve chamber 292. The valve spool 298 is formed with a restricted passageway or orifice 300 providing constant but restricted communication between the first or line-pressure outlet port 294 and the valve chamber 292, viz., between the line-pressure outlet port 294 and the second or line-pressure delivery port 268 of the third gear-direct drive shift valve unit 260. The valve spool 298 of the one-way orifice valve 262 is axially movable in the valve chamber 292 between a first axial position closest to the first or line-pressure outlet port 294 and covering the second or drain port 296 as shown and a second axial position remotest from the line-pressure outlet port 294 and uncovering the drain port 296. When the valve spool 298 is in the second axial position thereof uncovering the drain port 296, practically unrestricted communication is established between the first and second or line-pressure outlet and drain ports 294 and 296 through the valve chamber 292. The valve spool 298 is urged toward the first axial position thereof by suitable biasing means such as a preloaded helical compression spring 302 which is received at one end in the valve spool 298 and seated at the other end on a suitable spring retainer element 304 fixedly positioned in the valve chamber 292.

Figure 5:
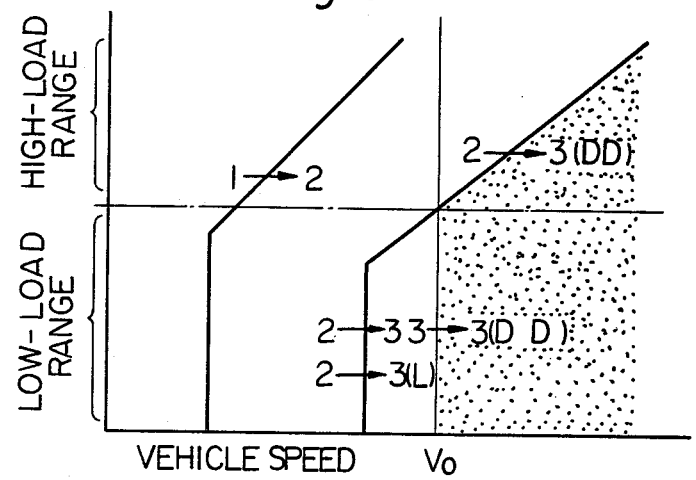
FIG. 5 is a graph similar to FIG. 1 but shows gear upshift schedules achieved in a three-forward-speed automatic power transmission incorporating the embodiment of the present invention as shown in FIG. 4.

Operation of the direct-drive control valve means thus constructed and arranged will be hereinafter described with concurrent reference to FIGS. 2 to 4 and further to FIGS. 5 and 6 of the drawings.

When the second-third gear shift valve 226 of the hydraulic control system illustrated in FIG. 3 is moved into the upshift position with the manually-operated selector valve 188 in the automatic forward-drive range position DR, the line pressure $P_1$ is developed in the oil circuit 232 leading to the front or high-and-reverse clutch 174 and the release-side chamber 186 of the servo unit 182 of the brake band 180 as previously discussed. The brake band 180 is therefore released and at the same time the front or high-and-reverse clutch 174 is coupled with the rear or forward-drive clutch 176 held in the coupled condition thereof, thereby establishing the third or top gear condition in the transmission mechanism. If, under these conditions, the vehicle speed is lower than the previously mentioned predetermined level Vo, the force resulting from the governor pressure $P_2$ acting on the outer end face of the second land 282 of the valve spool 278 of the third gear-direct drive shift valve unit 260 illustrated in FIG. 4 if less than the force of the spring 290 urging the valve spool 278 against the governor pressure. The valve spool 278 is thus maintained in the first axial position thereof closing the first or line-pressure inlet port 266 and providing communication between the second and fourth or line-pressure delivery and drain ports 268 and 272 through the circumferential groove 284 in the valve spool 278 in the third gear-direct drive shift valve 260 as shown in FIG. 4. The line pressure $P_1$ which has been extended to the first or line-pressure inlet port 266 of the valve unit 260 from the oil circuit 232 through the passageway 274 is, thus, not passed through the one-way orifice valve 262 to the variable-volume chamber 106 in the torque converter and direct-drive clutch arrangement of FIG. 2. When the vehicle speed is lower than the predetermined level Vo, the direct-drive clutch unit 14 is in this fashion held uncoupled even though an upshift has been made from the second gear to the third gear in the automatic forward-drive range as will be seen from that portion of the plot which is indicated by arrow 2 to 3 (L) in FIG. 5 in which the direct-drive range is shown by the dotted area. Under these conditions, the driving torque of the engine crankshaft 10 is transmitted to the transmission input shaft 16 through the torque converter unit 12 so that the vehicle can be accelerated for higher speed in stable condition. When the vehicle speed thus increased exceeds the predetermined level Vo, then the force resulting from the governor pressure $P_2$ acting on the second land 282 of the valve spool 278 from the third or control port 270 in the third gear-direct drive shift valve unit 260 overcomes the opposing force of the spring 290 and moves the valve spool 278 from the first axial position into the second axial position thereof, blocking the communication between the second and fourth or line-pressure delivery and drain ports 268 and 272 and providing communication between the first and second or line-pressure inlet and delivery ports 266 and 268 through the circumferential groove 284 in the valve spool 278. The line pressure $P_1$ which has been extended to the line-pressure inlet port 266 by way of the oil circuit 232 and the passageway 274 is now passed through the valve chamber 264 and the line-pressure delivery port 268 into the valve chamber 292 of the one-way orifice valve unit 262. The line pressure is then passed at a restricted rate through the orifice 300 in the valve spool 298 to the first or line-pressure outlet port 294 in the one-way orifice valve unit 262 and is directed to the passageway 172 in the stationary wall structure 162 shown in FIG. 2. The line pressure in the passageway 172 is directed through the passageway 164 in the wall structure 162, the diametrical through hole 166 and axial bore 168 in the transmission input shaft 16 and the open space 42a and groove 170 in the rear hub portion 40 of the torque converter cover 36 to the variable-volume chamber 106 between the rear face of the converter cover 36 and the front face of the clutch piston 102. This causes the clutch piston 102 to be moved rearwardly away from the converter cover 36 and brings the driving plates 114 on the converter cover 36 into driving engagement with the driven plates 132 of the clutch disc assembly 122. The direct-drive clutch unit 14 is in this fashion coupled so that the driving torque of the engine crankshaft 10 is transmitted through the converter cover 36 and clutch disc assembly 122 to the transmission input shaft 16. The torque converter unit 12, direct-drive clutch unit 14 and transmission input shaft 16 are now bodily rotated as a single unit with the engine crankshaft 10 and produce a direct-drive condition in which the torque transmission ratio between the engine crankshaft 10 and the transmission input shaft 16 is 1 vs. 1. While, thus, the direct-drive clutch unit 14 is held uncoupled for some time after an upshift has been made to the third gear if the engine is operating under low-load conditions driving the vehicle at a speed lower than the predetermined level Vo as will be seen from the arrow 2 to 3 (L) in FIG. 5, the direct-drive clutch 14 is coupled as soon as the vehicle speed reaches the level Vo as will be seen from arrow 2 to 3 (DD) in FIG. 5. If the engine is operating under high-load conditions driving the vehicle at a speed higher than the predetermined level Vo when the third gear condition is produced in the transmission mechanism, the direct-drive clutch unit 14 is promptly brought into the coupled condition as will be understood from the foregoing description and as indicated by arrow 2 to 3 (DD) in FIG. 5. The oil pressure developed in the valve chamber 292 of the one-way orifice valve unit 262 is passed to the first or line-pressure outlet port 294 of the valve unit 262 through the orifice 300 in the valve spool 298 and accordingly at a restricted rate. This means that the direct-drive clutch unit 14 shown in FIG. 2 is coupled at a limited rate and assures moderate direct coupling between the engine crankshaft 10 and the transmission input shaft 16 when an upshift is to be made direct from the second gear condition to the direct-drive condition or the third gear condition is to be shifted to the direct-drive condition. Once the direct-drive condition is thus established with the oil communication maintained between the line-pressure inlet port 266 of the third gear-direct drive shift valve unit 260 and the line-pressure outlet port 294 of the one-way orifice valve unit 262, the oil pressures obtaining on both sides of the valve sleeve 298 of the latter valve unit are equalized. Under these conditions, the valve spool 298 of the one-way orifice valve unit 262 is assuredly held in the first axial position thereof closing the second or drain port 296 by the force of the compression spring 302 urging the valve spool 298 toward the particular axial position. The compression spring 302 is thus effective to prevent the valve spool 298 from being in a floating condition that may allow the valve spool 298 to move into the second axial position providing communication between the first and second or line-pressure outlet and drain ports 294 and 296 when the direct-drive condition is established. The compression spring 302 should therefore be selected in such a manner as to be capable of slightly overcome such a floating tendency of the valve spool 298.

When the vehicle speed is lowered below a predetermined level Vo' which is approximately equal to the above-mentioned level Vo' the governor pressure $P_2$ in the third or control port 270 of the third gear-direct drive shift valve unit 262 is reduced accordingly so that the force resulting from the governor pressure acting on the second land 282 of the valve spool 278 is overcome by the force of the compression spring 290, thereby allowing the valve spool 278 to move back from the second axial position into the initial first axial position closing the first or line-pressure inlet port 266 and providing communication between the line-pressure delivery port 268 and the drain port 272 through the circumferential groove 284 in the valve spool 278 in the valve unit 260. This causes the oil in the valve chamber 292 of the one-way orifice valve unit 262 to be discharged through the drain port 272 of the third gear-direct drive shift valve unit 260 and produces rapid reduction of the oil pressure in the valve chamber 292 of the one-way orifice valve unit 262. The oil in the line-pressure outlet port 294 of the one-way orifice valve unit 262 therefore attempts to flow back into the valve chamber 292 of the valve unit 262. Such a flow is, however, restricted by the orifice 300 in the valve spool 298 so that the valve spool 298 is subjected to a differential oil pressure developed across the valve spool 298. The differential pressure urges the valve spool 298 away from the line-pressure outlet port 294 and as a consequence the valve spool 298 is moved against the force of the compression spring 302 from the first axial position into the second axial position thereof uncovering the second or drain port 296 of the valve unit 262 and accordingly providing communication between the first and second or line-pressure outlet and drain ports 296. The oil pressure in the line-pressure delivery port 294 is thus passed from the port 294 to the drain port 296 through the valve chamber 294 and produces rapid reduction of the oil pressure in the port 294 and accordingly in the oil pressure acting on the clutch piston 102 of the direct-drive clutch unit 14 shown in FIG. 2. The clutch piston 102 is now moved forwardly toward the rear face of the converter cover 36 and contracts the variable-volume chamber by the force resulting from the converter oil pressure acting on the rear face of the clutch piston 102 from the variable-volume space behind the clutch piston 102. The direct-drive clutch unit 14 is in this fashion uncoupled and accordingly the direct-drive condition is cleared rapidly. This is conductive to alleviation of the dragging of the driven plates 132 of the clutch disc assembly 122 on the driving plates 114 on the torque converter cover 36.

Figure 6:
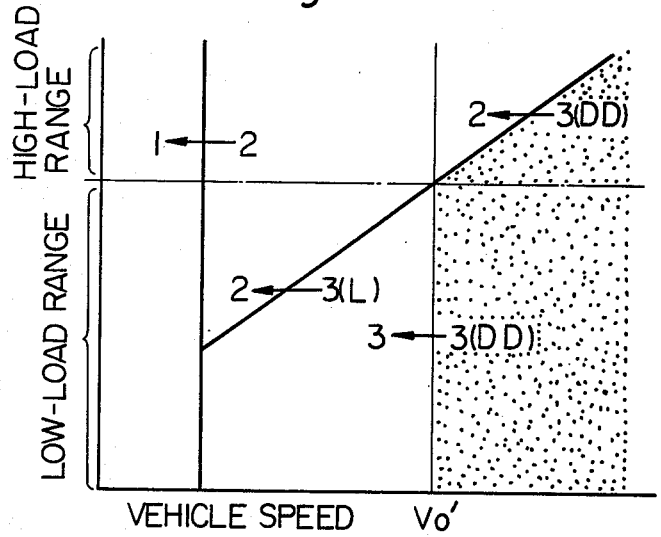
FIG. 6 is a graph also similar to FIG. 1 but shows gear downshift schedules achieved in the above-mentioned transmission.

A shift is thus made from the direct-drive condition to the third gear condition immediately when the vehicle speed is reduced to the level Vo′ if the engine is operating in low-load conditions, as will be seen from the arrow indicated by 3 (DD) to 2 in FIG. 6. If, however, the engine is operating in high-load conditions, a downshift is made from the third gear condition to the second gear condition before the vehicle speed is reduced beyond the predetermined level Vo′. The oil pressure in the line-pressure outlet port 294 of the one-way orifice valve unit 262 is therefore reduced or commences to be reduced immediately after the line pressure in the oil circuit 232 is drained off. Shift is thus made from the direct-drive condition directly to the second gear condition as will be seen from the arrow indicated by 3 (DD) to 2 in FIG. 6.

When the manually operated selector valve 188 is in the reverse position R, there is no output oil pressure delivered from the primary valve unit 202 of the governor valve 192. Under these conditions, the valve spool 278 of the third gear-direct drive shift valve unit 260 is maintained in the first axial position blocking the communication between the line-pressure inlet and delivery ports 266 and 268 of the valve unit 262 by the biasing force of the compression spring 290 in the absence of the governor pressure in the control port 270 with the result that the direct-drive clutch unit 14 shown in FIG. 2 is held in the uncoupled condition although the line pressure is developed in the oil circuit 232 leading to the line-pressure inlet port 266 of the third gear-direct drive shift valve unit 260.

The level Vo′ of the vehicle speed at which the direct-drive condition is to be cleared under low-load operating conditions of the engine has been assumed to be predetermined to be substantially equal to the level Vo of the vehicle at which the direct-drive condition is to be established under low-load operating conditions of the engine. Depending upon the specific performance characteristics of an engine to be in use, the vehicle speed level Vo′ may be made higher or lower than the vehicle speed level Vo. This can be accomplished by using a valve spool having lands with different cross sectional area to produce a differential pressure acting area therebetween as an alternative to the valve spool 278 incorporated into the third gear-direct drive shift valve unit 262 shown in FIG. 4.

What is claimed is:

1. In an automatic power transmission including a transmission input shaft, hydrodynamic torque transmitting means connected between the transmission input shaft and the output shaft of an engine of an automotive vehicle, fluid-operated direct-drive clutch means combined with the hydrodynamic torque transmitting means and forming a variable-volume chamber into which a control fluid pressure is to be directed when the clutch means is to be coupled, a gear mechanism having a plurality of forward-drive gear ratios including a top-gear ratio and a hydraulic control system including first fluid circuit means for developing therein a first control fluid pressure when the top-gear ratio is in use and second fluid circuit means for developing therein a second control fluid pressure when any of said forward-drive gear ratios is in use, direct-drive control valve means responsive to the first and second control fluid pressures and operative to cause said direct-drive clutch means to be coupled substantially simultaneously when said top-gear ratio is produced in said gear mechanism under high-load operating conditions of the engine and to cause said direct-drive clutch means to be coupled at a retarded timing after the top-gear ratio has been produced in the gear mechanism under low-load operating conditions of the engine.

2. Direct-drive control valve means as set forth in claim 1, comprising a shift valve unit having a first port communicating with said first fluid circuit means and a second port communicating with said variable-volume chamber and communicable with the first port and including a valve element having a first position blocking communication between the first and second ports and a second position providing communication between the first and second ports, the valve element being biased toward the first position thereof and being responsive to said second control fluid pressure in said second fluid circuit means for being moved into the second position thereof when the second control fluid pressure is representative of a vehicle speed higher than a predetermined level.

3. Direct-drive control valve means as set forth in claim 2, further comprising an orifice valve unit between said variable-volume chamber and said shift valve unit and operative to pass said first control fluid pressure from the shift valve unit to the variable-volume chamber at a restricted rate when said valve element of the shift valve unit is in said second position thereof and to discharge the fluid from the variable-volume chamber through the orifice valve unit at a substantially unrestricted rate when the shift valve unit is moved from the second position into the first position thereof.

4. Direct-drive control valve means as set forth in claim 2, in which said shift valve unit further has a third port in communication with said second fluid circuit means and a third port which is drained off, said valve element constituting a valve spool having first and second lands axially spaced apart from each other and forming a circumferential groove therebetween, the first land being in a position to close said first port when the valve element is in said first position thereof and being in a position providing said communication between the first and second ports through said circumferential groove when the valve element is in said second position thereof and the second land being in a position providing communication between the second and fourth ports through said circumferential groove when the valve element is in the first position thereof and in a position closing said fourth land when the valve element is in said second position thereof.

5. Direct-drive control valve means as set forth in claim 4, further comprising an orifice valve unit provided between said variable-volume chamber and said second port/of the shift valve unit and operative to pass said first control fluid pressure from the second port to the variable-volume chamber at a restricted rate when said valve element of the shift valve unit is in the second position thereof and to discharge the fluid from the variable-volume chamber through the orifice valve unit at a substantially unrestricted rate when the shift valve unit is moved from the second position into the first position thereof.

6. Direct-drive control valve means as set forth in claim 5, in which said orifice valve unit comprises a valve chamber in constant communication with the second port of said shift valve unit, the valve chamber having a first port in constant communication with said variable-volume chamber and a second port which is drained off, and a valve element movable in said valve chamber between a first position closing said second port of the orifice valve unit and a second position allowing the second port of the orifice valve unit to open and communicate with the first port of the orifice valve unit through said valve chamber, said valve element of the orifice valve unit being formed with a restricted fluid passageway providing constant and restricted communication between the second port of the shift valve unit and the first port of the orifice valve unit.

7. Direct-drive control valve means as set forth in claim 6, in which said orifice valve unit further comprises biasing means urging said valve element of the orifice valve unit toward said first position thereof.

8. In an automatic power transmission including a transmission input shaft, hydrodynamic torque transmitting means connected between the transmission input shaft and the output shaft of an engine of an automotive vehicle, fluid-operated direct-drive clutch means combined with the hydrodynamic torque transmitting means and forming a variable-volume chamber into which a control fluid pressure is to be directed when the clutch means is to be coupled, a gear mechanism having a plurality of forward-drive gear ratios including a top-gear ratio and a hydraulic control system including first fluid circuit means for developing therein a first control fluid pressure when the top-gear ratio is in use and second fluid circuit means for developing therein a second control fluid pressure when any of said forward-drive gear ratios is in use, direct-drive control valve means comprising a valve element movable between first and second positions, the valve element being yieldingly biased toward the first position thereof and being effective in the first position to obstruct communication between said first fluid circuit means and said variable-volume chamber and to release the control fluid pressure from said variable-volume chamber to exhaust, one portion of the valve element being exposed to the second control fluid pressure in said second fluid circuit means such that the valve element is moved into the second position thereof when the second control fluid pressure is representative of a vehicle speed higher than a predetermined level, the valve element being effective in the second position thereof to provide communication between said first fluid circuit means and said variable-volume chamber, whereby said direct-drive clutch means is caused to be coupled substantially simultaneously when said top-gear ratio is produced in said gear mechanism under high-load conditions of the engine and is caused to be coupled when the vehicle speed rises above a predetermined level after the top-gear ratio has been produced in the gear mechanism under low-speed operating conditions of the engine.

* * * * *